United States Patent
Tuttle et al.

[15] 3,690,008
[45] Sept. 12, 1972

[54] MULTI PATIENT DENTAL INSTRUCTION CONSOLE

[72] Inventors: Gary G. Tuttle, 25381 Posada Lane, Mission Viejo, Calif. 92675; Douglas H. Klick, 4042 Aladdin Dr., Huntington Beach, Calif. 92649

[22] Filed: April 26, 1971

[21] Appl. No.: 137,147

[52] U.S. Cl. .................................................. 32/71
[51] Int. Cl. .............................................. A61c 19/00
[58] Field of Search ................. 32/71, 22, 23, 24, 25

[56] References Cited

UNITED STATES PATENTS

| | | | |
|---|---|---|---|
| 1,584,323 | 5/1926 | Price et al. | 35/58 |
| 3,497,955 | 3/1970 | Gallagher | 32/22 |

*Primary Examiner*—Robert Peshock
*Attorney*—Beehler, Arant & Jagger

[57] ABSTRACT

A multi patient dental instruction console is disclosed comprised of a table top with a plurality of stations thereabout. Each station has a compartment with a lid forming a part of the table top when closed. Each compartment provides facilities and oral hygiene items required to enable a patient to be instructed in the proper caring for the teeth. When the lid is opened it is held at a desired angle to enable a patient to observe himself in a mirror attached to the underside of the lid. A cuspidor in the form of a funnel is provided in each compartment. The lower end of each of the funnels is connected by a length of flexible hose to a common manifold which has its outlet connected to a trap. A source of vacuum is connected to the trap to aid in withdrawing fluid from the flexible hoses into the trap.

6 Claims, 4 Drawing Figures

PATENTED SEP 12 1972　　　3,690,008

INVENTORS.
GARY G. TUTTLE
DOUGLAS H. KLICK
BY Beehler, Arant & Jagger
ATTORNEYS.

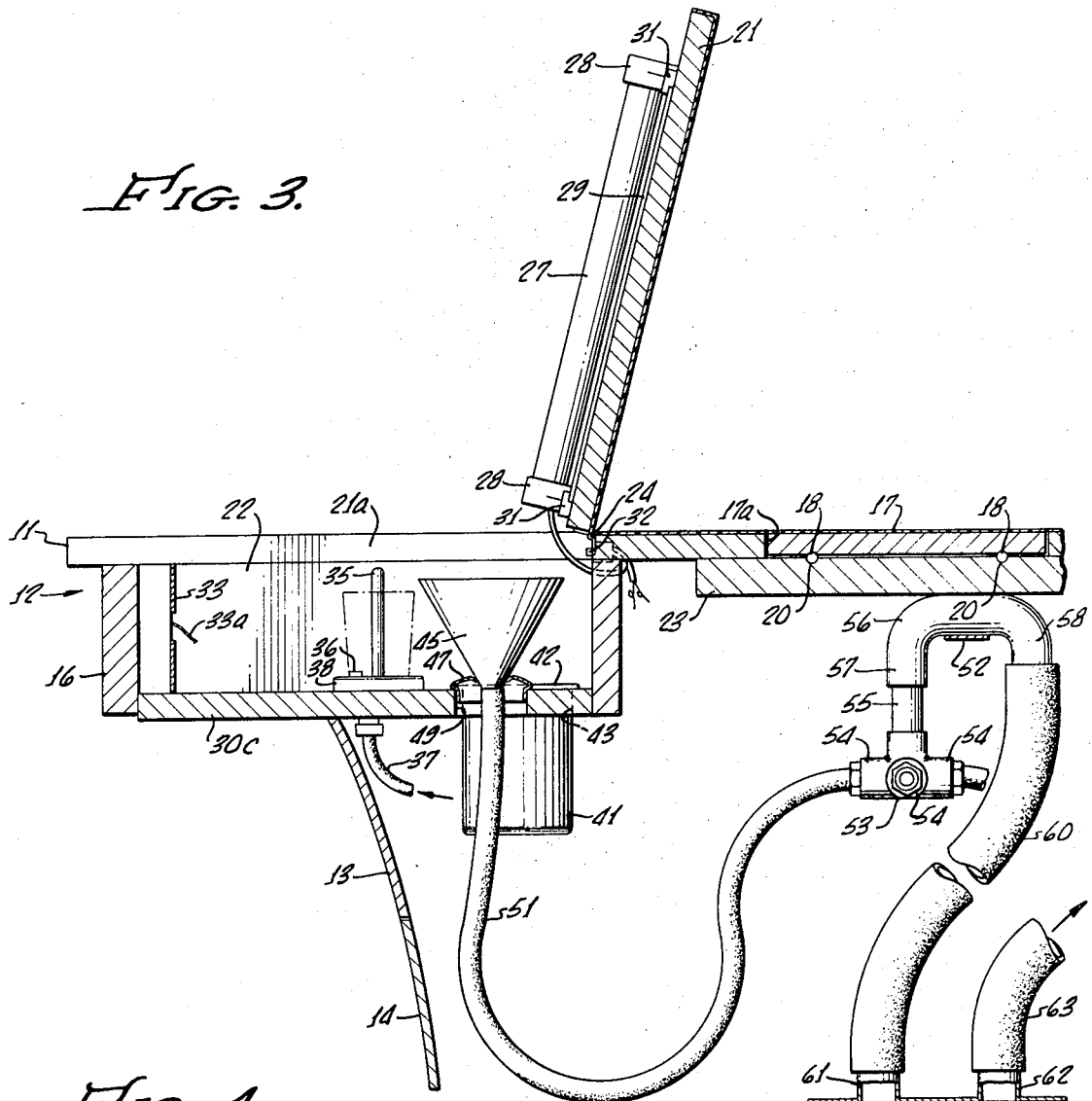
Fig. 3.
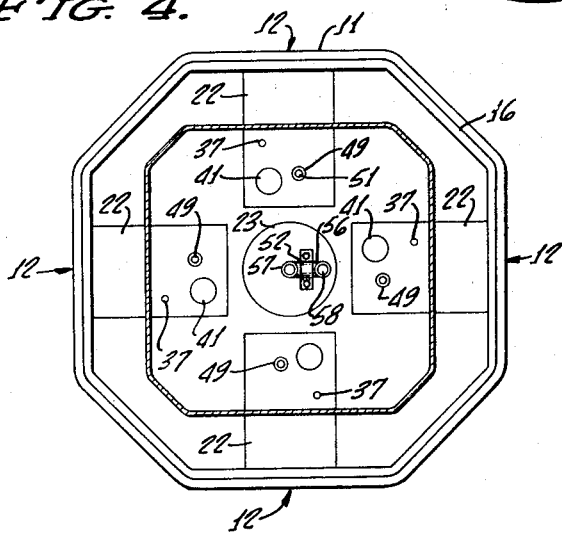
Fig. 4.
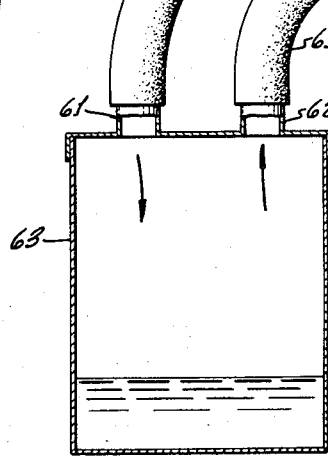
INVENTORS.
GARY G. TUTTLE
DOUGLAS H. KLICK
BY Beehler, Arant & Jagger
ATTORNEYS.

MULTI PATIENT DENTAL INSTRUCTION CONSOLE

This invention relates to educational equipment and more particularly to a dental instruction console usable in conducting educational programs on the proper care of the teeth.

In the interest of making it practical and feasible for the dentist to be able to educate his patients in the proper techniques of preventive dentistry, it is highly desirable to provide a dental instruction console with a plurality of stations, wherein each of the stations is conveniently arranged so as to provide the necessary facilities and store the oral hygiene items required for the education of a patient under the supervision of a dentist or hygienist in the proper procedures for brushing and otherwise caring for the teeth and mouth. Such an arrangement enables several patients to be simultaneously instructed in this respect thus minimizing the cost of conducting such an educational dental health program which, because of the high cost of practicing dentistry, would otherwise be prohibitive if provided for the patients one at a time.

Accordingly, the primary object of this invention is to provide a simply constructed, dental instruction console which can be used for simultaneously educating several patients in the proper techniques for the brushing and caring of the teeth.

Another object of the invention is to provide a readily available multi patient dental instruction console that takes up a minimum of space, that is convenient for patients to use, and that resembles an ordinary table which can be employed for other purposes when not being used for the instruction of patients.

With these and other objects in view, the invention consists of the construction, arrangement and combination of the various parts of the device, whereby the objects contemplated are attained as herein set forth, pointed out in the appended claims and illustrated in the accompanying drawings.

Referring to the drawings:

FIG. 3 is a cross-sectional view of the station as taken along lines 3—3 of FIG. 2.

FIG. 4 is a bottom view of the dental instruction console taken just below the table top thereof.

Figure 1:
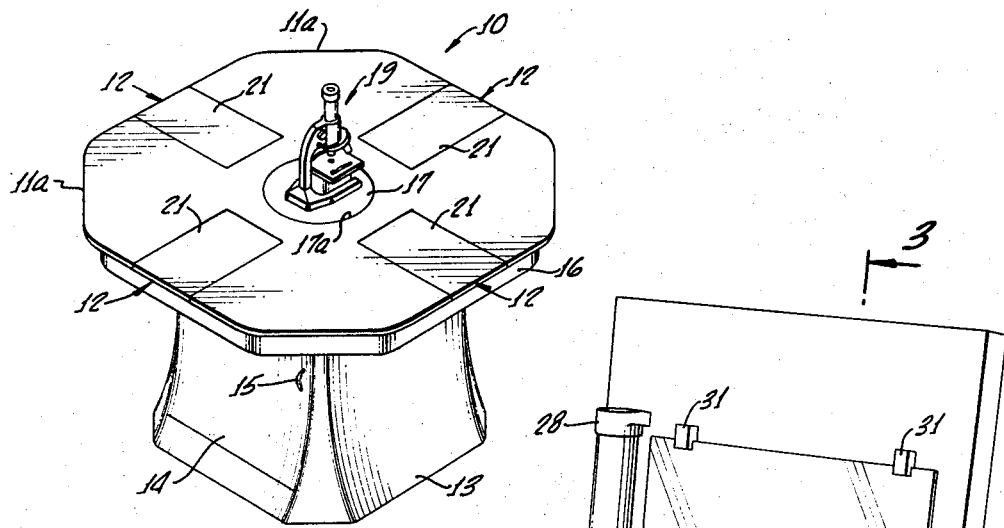
FIG. 1 shows an overall perspective view of the dental instruction console of the present invention.

Referring to FIG. 1 of the drawings, the dental instruction console 10 shown comprises a table top 11 positioned on a generally rectangular base 13. The table top 11 is formed of wood having a laminated plastic covering and is in the shape of a square with the corners 11a thereof preferably cut off at 45° to provide a more compact plan contour for the console. Secured about the bottom edge of table top 11 such as to conform with the outer plan contour thereof is a peripheral frame 16, as best shown in FIG. 4. A door 14 having a handle 15 is located on one side of the base 13 for providing access to the storage area located therein below the table top 11. Positioned within a central circular opening 17a of the table top 11 is a small turn-table 17 upon which is mounted a microscope 19. As shown in FIG. 3, turn-table 17 is designed to swivel on a number of ball bearings 18 riding in a circular groove 20 that is formed in part on the lower surface of turn-table 17 and in part on the upper surface of a center circular support 23 attached to the under side of the table top 11.

Figure 2:
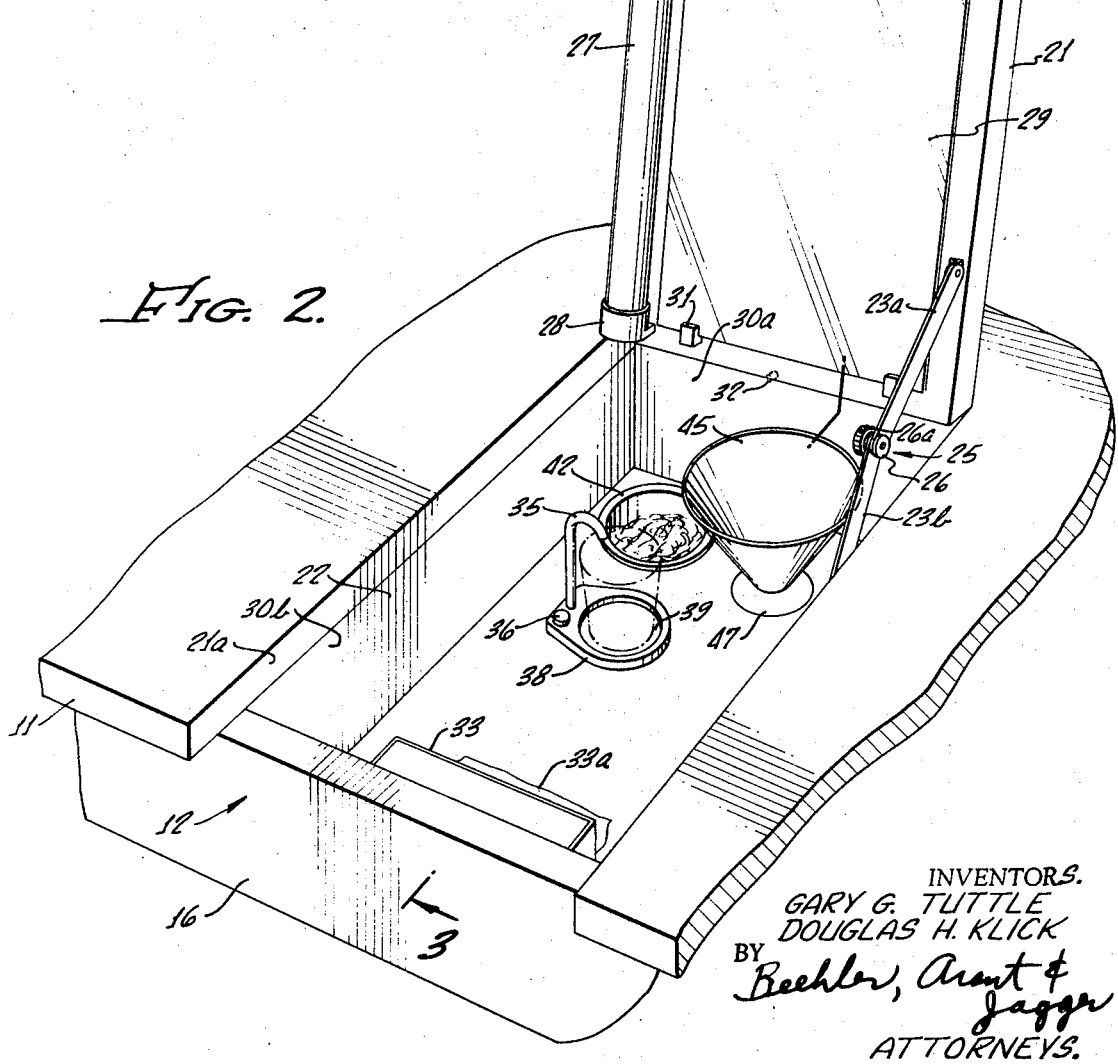
FIG. 2 is a perspective view of one of the stations of the console in FIG. 1 showing a compartment therefor with its lid raised to an operative position such as to expose the facilities and oral hygiene items located within the compartment.

A station 12 is provided on each of the four sides of the table top 11. As shown in FIGS. 2 and 3, each of the stations 12 includes a lid 21 which when closed fits within a rectangular cutout 21a on the table top 11 such as to be flush with the surface thereof. Each of the lids 21 is connected by a hinge 24 on the back end thereof to the rear wall of the cutout 21a and thus provides a cover for a rectangular compartment 22 located below the cutout 21a of table top 11. Each rectangular compartment 22 is formed of a back wall 30a, side walls 30b and a bottom wall 30c. A portion of the frame 16 forms the front wall of each of the compartments.

Each lid 21 is provided with a side brace 25 formed of a pair of linkages 23a and 23b. The outer ends of linkages 23a and 23b are respectively connected to the underside of lid 21 and the side of compartment 22, and threaded openings on the inner ends of these linkages are joined by a threaded bolt 26 having a knurled head forming a knob 26a which when tightened fixes the side brace 25 such as to hold the lid 21 at any desired angle in its raised position relative to the table top 11. The lid 21 has on the inside surface thereof a mirror 29 attached by clips 31 and a fluorescent light tube 27 connected to a pair of sockets 28 provided on one side of the mirror 29. A spring loaded, push-type light switch 32 located on the rear end of the rectangular cutout 21a behind the hinged end of lid 21 is automatically released to turn on the light tube 27 when the lid is opened.

Within the compartment 22 on the inside front wall thereof formed by the portion of frame 16 is a box-like container 33 for sanitary tissues 33a. Centrally located on the bottom wall 30c of the compartment 22 is a stand 38 for a water spout 35. The stand is provided with a push botton valve 36 for controlling the flow of water from an inlet 37 to the spout 35 located in the base 13. The stand 38 is formed with a recess 39 for holding a drinking glass in position below the water spout 35. Positioned in a circular opening 43 on one side of bottom wall 30c toward the back of the compartment 22 is a cylindrical container 41 for waste, such as the used tissues 33a. The container 41 is provided with a flange 42 about its upper end which enables it to be suspended in the opening 43 in the bottom wall 30c of the compartment 22 and easily lifted out for disposing of the waste therein. Located on the other side toward the back portion of the compartment 22 is a cuspidor in the form of a funnel 45 whose throat end rests within a circular fixture 47 secured in an opening 49 in the bottom wall 30c of the compartment 22. Each compartment 22 is also provided with other oral hygiene supplies (not shown) such as a tooth brush, tooth paste, dental floss, etc., as needed to carry out the program of proper dental care and good oral health for the patient.

As shown in FIG. 3, a length of flexible rubber hose 51 attached to the throat end of the funnel 45 is connected to one of four inlets 54 of a manifold 53 which is held by its outlet 55 below the center of the table top 11 by a U-shaped type fixture 56. The fixture 56 is secured to support 23 by a bracket 52.

It should now be clearly understood that each of the four stations 12 provided on the four sides of the table top 11 are similar to the one shown in FIGS. 2 and 3, in that each of the stations 12 has a length of flexible hose 51 connecting from the throat end of the funnel 45 to one of the four inlets 54 of the manifold 53. The U-shaped pipe fixture 56 has one of its ends 57 connected to the outlet 55 of the manifold 53 and its other end 58 connected to a hose 60 which leads down to connect to the inlet 61 of a trap 63 in the form of a glass container located within the base 13 of the dental instruction console 10. The trap 63 is also provided with another outlet 62 on which one end of a hose 64 is connected. The other end of hose 64 is connected to a source of vacuum (not shown).

It should be particularly noted that the length of flexible hose 51 connected to the throat end of the funnel 45 provided at each of the stations 12 is made sufficiently long to permit a patient seated, for example, at a station 12 to reach into the compartment 22 for the funnel 45 and easily move it to his mouth for the purpose of disposing of the water or other fluid being used for rinsing the mouth during the program of instruction being conducted for the patient. Thus to provide the slack in the flexible hose 51 to permit the forward movement of the funnel 45, a portion of the hose 51 loops down into the base 13 of the console below the level of the manifold 53 and this is especially the situation when the funnel 45 is placed with its throat end in the opening of fixture 47 provided in the bottom wall 30c of the compartment 22. It is for this reason that the vacuum is provided in the system to assist in the withdrawing of the fluid from each of the hoses 51. It should be further especially noted that since the hoses 51 from each of the four stations 12 are interconnected in common to the manifold 53, the provision of the vacuum at the outlet 55 of the manifold 53 insures that the waste fluid from one or more of the hoses 51 does not back up into any of the other hoses 51.

It is now clear that when the dental instruction console 10 of the present invention is not in use, the lids 21 at each of the four stations 12 are closed such that their top surfaces are flush with the table top 11 and, with the microscope 19 removed from the turn table 17, the table top 11 of the console 10 provides a flat working surface which can be employed for any desired purpose. When the console 10 is to be used to conduct a program in preventive dentistry, the microscope 19 need be merely placed on the turn-table 17. Then the patients, preferably seated at each of the stations 12, simply lift the lids 21 by placing their fingers under the front part thereof extending beyond the frame 16 adjacent the bottom edge of the table top 11. Each lid 21 can then be secured by knob 26a to an angular position best suited for the patient viewing himself in the mirror 29 with the aid of the fluorescent light 27 which has been turned on as a result of raising the lid.

During the conducting of the program in oral health by the use of the console 10 of the present invention, there are occasions when it is of great benefit to the patient to observe the condition of his mouth by placing a sample of the saliva therefrom on a slide and inspecting it by use of the microscope 19. Thus by loosening the knob 26a and lowering the lid 21 to close the compartment 22, the patient can easily reach in and swivel the turn-table 17 such that the microscope 19 mounted thereon is in a position to enable him to observe, for example, the reduction in bacteria in the mouth resulting from the cleansing action he has just completed on his teeth.

While the description has been concerned with a particularly structural embodiment of the present invention, it is to be understood that many modifications and variations in the construction and arrangement may be provided for without departing from the spirit and scope of the invention or sacrificing any of its advantages. The invention is therefore considered as including all such possible modifications and variations coming within the ligitimate and valid scope of the appended claims.

Having described the invention, what is claimed as new in support of Letters Patent is:

1. A multi patient dental instruction console comprising: a table top; a base for said table top; and a plurality of stations located about said table top; each said station including: a compartment disposed below the table top; a lid for each said compartment; said lid disposed in an opening in said table top above said compartment and hingedly connected at the back end thereof; a mirror attached to the underside of said lid; and a cuspidor in the form of a funnel with the base thereof positioned in an opening provided in the bottom of said compartment; a manifold having a plurality of inlets and a single outlet located below the center of said table top; a plurality of flexible hoses; each said flexible hoses having one end connected to the throat of the funnel at one of said stations and the other end thereof connected to one of the inlets of said manifold; a trap located in said base having an inlet and an outlet; a hose connecting the outlet of said manifold to the inlet of said trap; and an additional hose connecting a source of vacuum to the outlet of said trap.

2. The invention in accordance with claim 1 including a fluorescent tube attached on the side of the inner surface of the lid at each said station; and a light switch at each said station which turns on the tube when the lid is raised.

3. The invention in accordance with claim 1 including a turn-table located in an opening provided in the center of said table top and disposed to be flush with the top surface thereof.

4. The invention in accordance with claim 1 including means for supporting the lid at each station at any desired angle in its raised position relative to the surface of the table top.

5. The invention in accordance with claim 1 including a water spout within the compartment at each said station and a button valve associated with each said water spout for controlling the flow of water therethrough.

6. The invention in accordance with claim 1 wherein said table top is provided with a laminated plastic covering.

* * * * *